(12) United States Patent
Li et al.

(10) Patent No.: US 12,026,863 B2
(45) Date of Patent: Jul. 2, 2024

(54) IMAGE PROCESSING METHOD AND APPARATUS, AND DEVICE

(71) Applicant: Huawei Technologies Co., Ltd., Shenzhen (CN)

(72) Inventors: Yu Li, Shenzhen (CN); Feilong Ma, Beijing (CN); Tizheng Wang, Shenzhen (CN); Xiujie Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 557 days.

(21) Appl. No.: 17/230,169

(22) Filed: Apr. 14, 2021

(65) Prior Publication Data

US 2021/0241432 A1 Aug. 5, 2021

Related U.S. Application Data

(63) Continuation of application No. PCT/CN2019/091717, filed on Jun. 18, 2019.

(30) Foreign Application Priority Data

Oct. 15, 2018 (CN) .......................... 201811199234.8

(51) Int. Cl.
*G06T 7/194* (2017.01)
*G06F 18/214* (2023.01)
(Continued)

(52) U.S. Cl.
CPC .............. *G06T 5/94* (2024.01); *G06F 18/214* (2023.01); *G06N 3/08* (2013.01); *G06T 5/20* (2013.01);
(Continued)

(58) Field of Classification Search
CPC .......... G06T 5/008; G06T 5/002; G06T 5/20; G06T 7/194; G06T 2207/10016;
(Continued)

(56) References Cited

U.S. PATENT DOCUMENTS 7,899,082 B2 3/2011 Shae et al.
9,965,865 B1 * 5/2018 Agrawal ............ G06V 10/7747
(Continued)

FOREIGN PATENT DOCUMENTS

CN 101031030 A 9/2007
CN 101072289 A 11/2007
(Continued)

OTHER PUBLICATIONS

Wei, W., "Learning Based Image Enhancement," Xidian University Press, Feb. 1, 2013, 2 pages.
(Continued)

*Primary Examiner* — Phuoc Tran
(74) *Attorney, Agent, or Firm* — Conley Rose, P.C.

(57) ABSTRACT

An image processing method includes determining a target area and a background area in an image by performing mask segmentation on the image. Different color processing modes are applied to the target area and the background area, so that luminance of the target area is greater than luminance of the background area, or chrominance of the target area is greater than chrominance of the background area, and a main object corresponding to the target area is more prominently highlighted.

20 Claims, 5 Drawing Sheets

(51) Int. Cl.
*G06N 3/08* (2023.01)
*G06T 5/20* (2006.01)
*G06T 5/70* (2024.01)
*G06T 5/94* (2024.01)
*G06V 20/00* (2022.01)
*H04N 5/262* (2006.01)
*H04N 23/61* (2023.01)

(52) U.S. Cl.
CPC ............... *G06T 5/70* (2024.01); *G06T 7/194* (2017.01); *G06V 20/35* (2022.01); *H04N 5/2621* (2013.01); *H04N 23/61* (2023.01)

(58) Field of Classification Search
CPC . G06T 2207/10024; G06T 2207/20084; G06T 7/11; G06T 7/90; G06F 18/214; G06N 3/08; G06V 20/35; H04N 5/2621; H04N 23/61
See application file for complete search history.

(56) References Cited

U.S. PATENT DOCUMENTS

| | | | |
|---|---|---|---|
| 10,049,308 | B1 * | 8/2018 | Dhua ................... G06T 11/60 |
| 2002/0093670 | A1 | 7/2002 | Luo et al. |
| 2008/0131001 | A1 | 6/2008 | Hofman et al. |
| 2011/0075925 | A1 | 3/2011 | Guo et al. |
| 2012/0007939 | A1 | 1/2012 | Michrowski et al. |
| 2015/0189182 | A1 | 7/2015 | Ho et al. |
| 2016/0027187 | A1 | 1/2016 | Wang et al. |
| 2016/0358337 | A1 | 12/2016 | Dai et al. |
| 2017/0200279 | A1 | 7/2017 | Zhong et al. |
| 2017/0244908 | A1 | 8/2017 | Flack et al. |
| 2017/0337693 | A1 * | 11/2017 | Baruch ................... G06T 7/174 |
| 2018/0152602 | A1 | 5/2018 | Saruhashi |
| 2019/0130191 | A1 * | 5/2019 | Zhou ...................... G06V 20/52 |
| 2019/0164257 | A1 | 5/2019 | Zhang et al. |
| 2019/0180107 | A1 * | 6/2019 | Pham ................... G06V 10/454 |

FOREIGN PATENT DOCUMENTS

| | | |
|---|---|---|
| CN | 102542593 A | 7/2012 |
| CN | 102567727 A | 7/2012 |
| CN | 102880873 A | 1/2013 |
| CN | 103648139 A | 3/2014 |
| CN | 104156947 A | 11/2014 |
| CN | 104754180 A | 7/2015 |
| CN | 105005980 A | 10/2015 |
| CN | 105049695 A | 11/2015 |
| CN | 105513081 A | 4/2016 |
| CN | 105872509 A | 8/2016 |
| CN | 106846321 A | 6/2017 |
| CN | 106851124 A | 6/2017 |
| CN | 106997595 A | 8/2017 |
| CN | 107509045 A | 12/2017 |
| CN | 107566723 A | 1/2018 |
| CN | 107665482 A | 2/2018 |
| CN | 107798653 A | 3/2018 |
| CN | 107948519 A | 4/2018 |
| CN | 107977940 A | 5/2018 |
| CN | 108010037 A | 5/2018 |
| CN | 108108697 A | 6/2018 |
| CN | 108133695 A | 6/2018 |
| CN | 108230252 A | 6/2018 |
| CN | 108234882 A | 6/2018 |
| CN | 108305223 A | 7/2018 |
| CN | 108491889 A | 9/2018 |
| CN | 108648139 A | 10/2018 |
| CN | 108648284 A | 10/2018 |
| CN | 109816663 A | 5/2019 |
| JP | 2002245471 A | 8/2002 |
| JP | 201845359 A | 3/2018 |
| WO | 2016197303 A1 | 12/2016 |
| WO | 2018145030 A1 | 8/2018 |

OTHER PUBLICATIONS

Ruirui, L., "Automatic Generation of Pencil Drawings Based on Multi-level Saliency Maps," Journal of Computer-Aided Design and Computer Graphics, vol. 30, No. 1, Jan. 2018, with an English Abstract, 9 pages.

Cavallaro, A., et al., "Semantic Segmentation and Description for Video Transcoding," International Conference on Multimedia and Expo. ICME ''03. Proceedings (Cat. No. 03TH8698), Date of Conference: Jul. 6-9, 2003, Date Added to IEEE Xplore: Aug. 18, 2003, 4 pages.

Yu. V. Dubenko, et al. Using Artificial Neural Networks to Recognize Objects on Image, Scientific works of KubGTU, No. 3, 2018, 14 pages.

Z. M. Sani, et al., Real-time daytime road marker recognition using features vectors and neural network, IEEE Conference on Sustainable Utilization And Development In Engineering and Technology (CSUDET), 2015, 6 pages.

Salnikov I.I., Integration Processes in Development Funds Implementation of Information Human Necessities Today, 2014, 2 pages.

Yagiz Aksoy, et al., Semantic Soft Segmentation, ACM Trans. Graph., vol. 37, No. 4, Article 72, Aug. 2018.

* cited by examiner

IMAGE PROCESSING METHOD AND APPARATUS, AND DEVICE

CROSS-REFERENCE TO RELATED APPLICATIONS

This application is a continuation of International Patent Application No. PCT/CN2019/091717 filed on Jun. 18, 2019, which claims priority to Chinese Patent Application No. 201811199234.8 filed on Oct. 15, 2018, both of which are hereby incorporated by reference in their entireties.

TECHNICAL FIELD

The present disclosure relates to the field of terminal technologies, and in particular, to an image processing method and apparatus, and a device.

BACKGROUND

Photographing is to use a camera or a video recorder to record an image of a person or an object. There are different photographing skills for different scenes, such as night scene photographing, rain scene photographing, building photographing, and portrait photographing. Dynamic photographing for movie art is also a type of photographing, but needs to comply with a specific principle. With advancement of the science and technology, photographing has become simpler and more popular.

With an increase in network bandwidth and enhancement of a terminal processing capability, video and image photographing and sharing become more convenient, and video consumption has become a new way of life for all people. Videos quickly become a traffic-intensive service on a network and are expected to account for 80% to 90% of total traffic in the next few years.

In daily life, photographing has become a main way for people to show themselves and find beauty of things. People want to perform photographing in more interesting styles. For example, during photographing, special effect processing of images or videos are completed, to implement photographing experience of "what you see is what you get". Therefore, for a non-professional, more novel image processing technologies need to be integrated into a terminal.

Currently, a video recording function of the terminal is monotonous. Currently, only conventional video photographing can be provided, lacking some personalized effects.

SUMMARY

The present disclosure provides an image processing method. A target area and a background area are determined in an image by performing mask (template) segmentation on the image. Different color processing modes are applied to the target area and the background area, so that luminance of the target area is greater than luminance of the background area, or chrominance of the target area is greater than chrominance of the background area, and a main object corresponding to the target area is more prominently highlighted. This enables a terminal user to have a movie special effect during photographing or video photographing, and improves photographing experience of the user.

Specific technical solutions provided in embodiments of the present disclosure are as follows.

According to a first aspect, an embodiment of the present disclosure provides an image processing method. The method is applied to a video recording process, and the method includes capturing N1 images in a first time period, capturing N2 images in a second time period, where the first time period and the second time period are adjacent time periods, and both N1 and N2 are positive integers, determining a first target area and a first background area from each of the N1 images, where the first background area is an area of the image other than the first target area, and the first target area in each of the N1 images corresponds to a first object, determining a second target area and a second background area from each of the N2 images, where the second background area is an area of the image other than the second target area, and the second target area in each of the N2 images corresponds to a second object, and processing the first target area in a first color processing mode, processing the first background area in a second color processing mode, processing the second target area in a third color processing mode, and processing the second background area in a fourth color processing mode, to obtain a target video. In the target video, chrominance of the first target area is greater than chrominance of the first background area, or luminance of the first target area is greater than luminance of the first background area. In addition, chrominance of the second target area is greater than chrominance of the second background area, or luminance of the second target area is greater than luminance of the second background area.

According to a second aspect, an embodiment of the present disclosure provides an image processing apparatus. The apparatus is used in a video photographing process, and the apparatus includes a photographing module, configured to capture N1 images in a first time period, and capture N2 images in a second time period, where the first time period and the second time period are adjacent time periods, and both N1 and N2 are positive integers, a determining module, configured to determine a first target area and a first background area from each of the N1 images, where the first background area is an area of the image other than the first target area, and the first target area in each of the N1 images corresponds to a first object, and determine a second target area and a second background area from each of the N2 images, where the second background area is an area of the image other than the second target area, and the second target area in each of the N2 images corresponds to a second object, and a color processing module, configured to process the first target area in a first color processing mode, process the first background area in a second color processing mode, process the second target area in a third color processing mode, and process the second background area in a fourth color processing mode, to obtain a target video. In the target video, chrominance of the first target area is greater than chrominance of the first background area, or luminance of the first target area is greater than luminance of the first background area. In addition, chrominance of the second target area is greater than chrominance of the second background area, or luminance of the second target area is greater than luminance of the second background area.

According to the first aspect or the second aspect, in a possible design, the first object and the second object are a same object.

According to the first aspect or the second aspect, in a possible design, the first object and the second object are different objects.

According to the first aspect or the second aspect, in a possible design, the first object or the second object includes at least one individual of an object category (for example, a person, an animal, or a plant).

According to the first aspect or the second aspect, in a possible design, the first object and the second object are determined according to a selection instruction of a user.

Specifically, for example, the first object is determined from a first image in the first time period according to the selection instruction of the user, and the first object is used as a target object in all images in the first time period. Likewise, the second object is determined from a first image in the second time period according to the selection instruction of the user, and the second object is used as a target object in all images in the second time period. For example, semantic segmentation may be performed on the image to obtain k masks. The k masks correspond to different object categories, a selection instruction input by the user corresponds to a specific mask or specific masks, and an object corresponding to the specific mask or the specific masks is a target object.

According to the first aspect or the second aspect, in a possible design, the first object and the second object are separately determined by a terminal based on content of two images at a preset time interval.

Specifically, for example, the first object is determined from a first image in the first time period, and the first object is used as a target object in all images in the first time period. Likewise, the second object is determined from a first image in the second time period, and the second object is used as a target object in all images in the second time period. A manner in which the first object is determined from the first image in the first time period, and the second object is determined from the first image in the second time period includes but is not limited to one of the following manners performing semantic segmentation on the image to obtain k masks, where the k masks correspond to different object categories, and if k=2, and the two masks include one object mask and one background mask, determining an image area corresponding to the object mask as a target area, and determining an area corresponding to the background mask as a background area, where an object corresponding to the object mask is the first object or the second object, if k is greater than 2 and a quantity of pixels included in k0 object masks in the k masks is greater than a preset threshold, determining an image area corresponding to the k0 object masks as a target area, and determining an image area corresponding to a remaining mask as a background area, where an object corresponding to the object mask is the first object or the second object, and k0 is a nonnegative integer less than k, if k is greater than 2, determining, as a target area, an image area corresponding to a mask that includes a largest quantity of pixels and that is in the k masks, and determining an image area corresponding to remaining masks as a background area, where an object corresponding to the object mask is the first object or the second object, if k is greater than 2, determining a target mask from the k masks based on preset priorities of the object categories, and determining an image area corresponding to the target mask as a target area, and determining an image area corresponding to remaining masks as a background area, where an object corresponding to the object mask is the first object or the second object, or if k is greater than 2, determining a target mask from the k masks according to a selection instruction of the user, and determining an image area corresponding to the target mask as a target area, and determining an image area corresponding to remaining masks as a background area, where an object corresponding to the object mask is the first object or the second object. The method may be specifically performed by the determining module.

According to the first aspect or the second aspect, in a possible design, the first color processing mode is the same as the third color processing mode, and the second color processing mode is the same as the fourth color processing mode.

According to the first aspect or the second aspect, in a possible design, the first color processing mode is the same as the third color processing mode, and the second color processing mode is different from the fourth color processing mode.

According to the first aspect or the second aspect, in a possible design, the first color processing mode is different from the third color processing mode, and the second color processing mode is the same as the fourth color processing mode.

According to the first aspect or the second aspect, in a possible design, the first color processing mode is different from the third color processing mode, and the second color processing mode is different from the fourth color processing mode.

According to the first aspect or the second aspect, in a possible design, the first color processing mode or the third color processing mode includes color retaining or color enhancement.

According to the first aspect or the second aspect, in a possible design, the second color processing mode or the fourth color processing mode includes black and white, darkening, blurring, or a retro mode.

According to a third aspect, an embodiment of the present disclosure provides a terminal device, including a camera, a memory, a processor, and a bus. The camera, the memory, and the processor are connected through the bus. The camera is configured to capture an image, and the memory is configured to store a computer program and an instruction. The processor is configured to invoke the computer program, the instruction, and the captured image that are stored in the memory, and is further specifically configured to enable the terminal device to perform any one of the foregoing possible design methods.

According to the third aspect, in a possible design, the terminal device further includes an antenna system. The antenna system receives and sends a wireless communication signal under control of the processor, to implement wireless communication with a mobile communications network. The mobile communications network includes one or more of the following a Global System for Mobile Communications (GSM) network, a code-division multiple access (CDMA) network, a 3rd generation (3G) network, a 4th generation (4G) network, a 5th generation (5G) network, a frequency-division multiple access (FDMA) network, a time-division multiple access (TDMA) network, a primary domain controller (PDC) network, a total access communication system (TACS) network, an Advanced Mobile Phone System (AMPS) network, a wideband CDMA (WCDMA) network, a time-domain synchronous CDMA (TDSCDMA) network, a WI-FI network, and a Long-Term Evolution (LTE) network.

The technical solutions in the foregoing possible designs may be combined without going against nature.

In a conventional technology, when a video or an image is photographed, a special effect is not rich enough without distinguishing between individuals or colors in any image. According to the present disclosure, different areas in an image can be distinguished between by using colors, so that a special effect of a photo or a video is enhanced, and a main object and a target in the image can be more highlighted. In this way, main roles are more prominent. In addition, the present disclosure can further provide more color changes and main object changes, to improve stickiness of a user.

DESCRIPTION OF EMBODIMENTS

The following clearly describes the technical solutions in the embodiments of the present disclosure with reference to accompanying drawings in the embodiments of the present disclosure. Definitely, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a terminal may be a device that provides a user with video photographing and/or data connectivity, a handheld device having a wireless connection function, or another processing device connected to a wireless modem, for example, a digital camera, a single-lens reflex camera, a mobile phone (or referred to as a "cellular" phone), or a smartphone. The terminal may be a portable, pocket-sized, handheld, or wearable device (for example, a smartwatch), a tablet computer, a personal computer (PC), a personal digital assistant (PDA), an in-vehicle computer, a drone, an aerial device, or the like.

Figure 1:
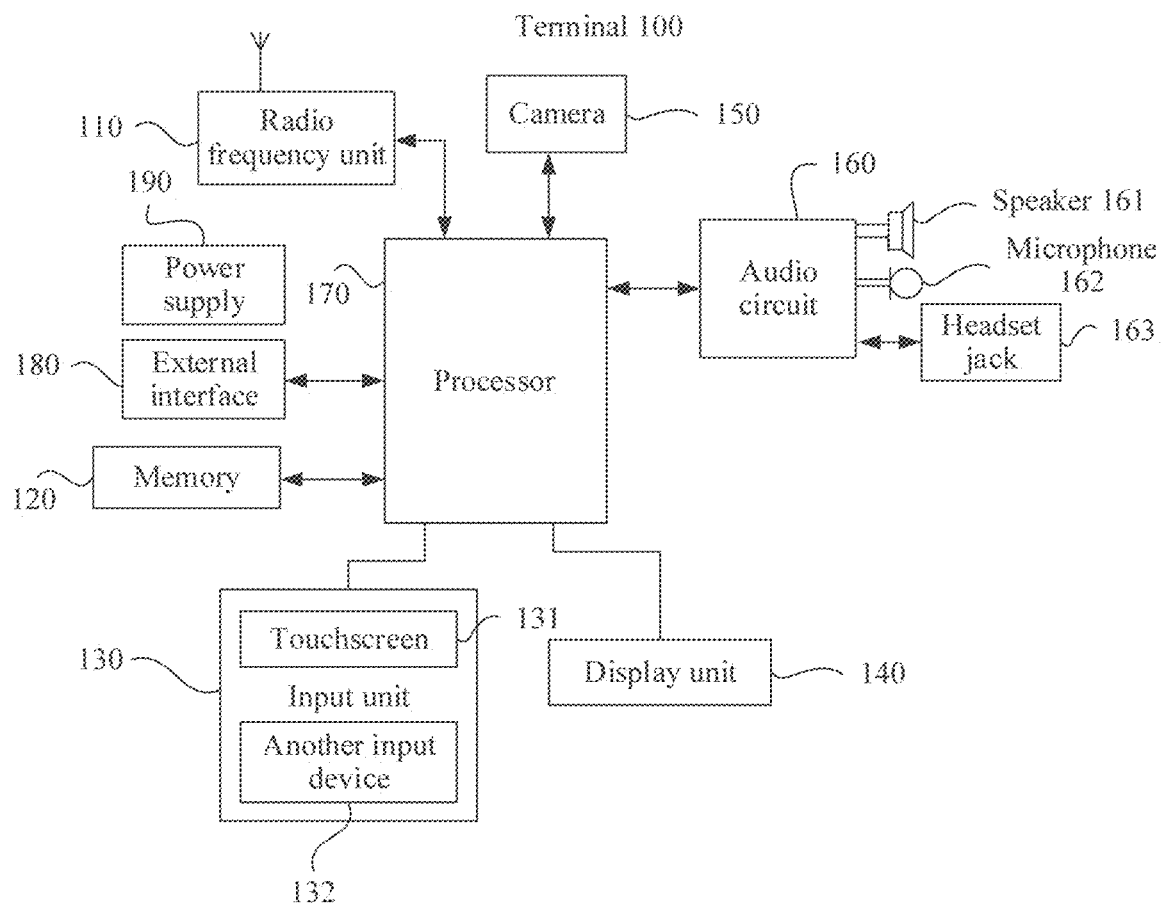
FIG. 1 is a schematic diagram of a structure of a terminal according to an embodiment of the present disclosure.

FIG. 1 is a schematic diagram of an optional hardware structure of a terminal 100.

As shown FIG. 1, the terminal 100 may include components such as a radio frequency unit 110, a memory 120, an input unit 130, a display unit 140, a camera 150, an audio circuit 160 (including a speaker 161 and a microphone 162), a processor 170, an external interface 180, and a power supply 190. A person skilled in the art may understand that FIG. 1 is merely an example of an intelligent terminal or a multi-functional device, and does not constitute a limitation on the intelligent terminal or the multi-functional device. The intelligent terminal or the multi-functional device may include more or fewer components than those shown in the figure, or combine some components, or include different components. For example, the intelligent terminal or the multi-functional device includes at least the memory 120, the processor 170, and the camera 150.

The camera 150 is configured to capture an image or a video, and may be triggered and started according to an instruction from an application program, to implement a photographing function or a video photographing function. The camera may include components such as an imaging lens, a light filter, and an image sensor. Light rays emitted or reflected by an object enter the imaging lens, pass through the light filter, and finally converge on the image sensor. The imaging lens is mainly configured to converge, into an image, light emitted or reflected by all objects (which may also be referred to as a to-be-photographed scenario, to-be-photographed objects, a target scenario, or target objects, and may also be understood as a scenario image that a user expects to photograph) in a photographing angle of view. The light filter is mainly configured to filter out a redundant light wave (for example, a light wave other than visible light, for example, infrared light) in light rays. The image sensor is mainly configured to perform optical-to-electrical conversion on a received optical signal, convert the optical signal into an electrical signal, and input the electrical signal to the processor 170 for subsequent processing. The camera may be located in front of the terminal device, or may be located on the back of the terminal device. A specific quantity and a specific arrangement manner of cameras may be flexibly determined based on a requirement of a designer or a vendor policy. This is not limited in this application.

The input unit 130 may be configured to receive input digit or character information, and generate a key signal input related to user settings and function control of the multi-functional apparatus. Specifically, the input unit 130 may include a touchscreen 131 and/or another input device 132. The touchscreen 131 may collect a touch operation (for example, an operation performed by the user on the touchscreen or near the touchscreen by using any proper object, for example, a finger, a joint, or a stylus) of the user on or near the touchscreen 131, and drive a corresponding connection apparatus based on a preset program. The touchscreen may detect a touch action of the user on the touchscreen, convert the touch action into a touch signal, send the touch signal to the processor 170, and can receive and execute a command sent by the processor 170. The touch signal includes at least contact coordinate information. The touchscreen 131 may provide an input interface and an output interface between the terminal 100 and the user. In addition, the touchscreen may be implemented in various types such as a resistive type, a capacitive type, an infrared type, and a surface acoustic wave type. In addition to the touchscreen 131, the input unit 130 may further include the another input device. Specifically, the another input device 132 may include but is not limited to one or more of a physical keyboard, a function key (for example, a volume control key or an on/off key 133), a trackball, a mouse, a joystick, and the like.

The display unit 140 may be configured to display information input by the user or information provided for the user, various menus of the terminal 100, an interaction interface, a file, and/or play any multimedia file. In this embodiment of the present disclosure, the display unit is further configured to display the image/video obtained by the terminal by using the camera 150. The image/video may include a preview image/video in some photographing modes, a photographed initial image/video, and a target image/video on which a specific algorithm processing is performed after photographing is performed.

Further, the touchscreen 131 may cover a display panel 141. After detecting the touch operation on or near the touchscreen 131, the touchscreen 131 transfers the touch operation to the processor 170 to determine a type of the touch event. Then, the processor 170 provides a corresponding visual output on the display panel 141 based on the type of the touch event. In this embodiment, the touchscreen and the display unit may be integrated into one component to implement input, output, and display functions of the terminal 100. For ease of description, in this embodiment of the present disclosure, a touch display screen represents a function set of the touchscreen and the display unit. In some embodiments, the touchscreen and the display unit may alternatively be used as two independent components.

The memory 120 may be configured to store an instruction and data. The memory 120 may mainly include an instruction storage area and a data storage area. The data storage area may store data such as a multimedia file and a text. The instruction storage area may store software units such as an operating system, an application, and an instruction required by at least one function, a subset thereof, or an extension set thereof. The memory 120 may further include a non-volatile random access memory and provide the processor 170 with functions including managing hardware, software, and data resources in a computing processing device and supporting control on the software and an application. The memory 120 is further configured to store a multimedia file, and store an execution program and an application.

The processor 170 is a control center of the terminal 100, and is connected to various parts of the entire terminal through various interfaces and lines. The processor 170 performs various functions of the terminal 100 and processes data by running or executing the instruction stored in the memory 120 and invoking the data stored in the memory 120, to perform overall control on the terminal. Optionally, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that the modem processor may alternatively not be integrated into the processor 170. In some embodiments, the processor and the memory may alternatively be implemented on a single chip. In some embodiments, the processor and the memory may be respectively implemented on independent chips. The processor 170 may be further configured to generate a corresponding operation control signal, send the operation control signal to a corresponding component in the computing processing device, and read and process data in software, especially read and process the data and the program in the memory 120, so that functional modules in the processor 170 perform corresponding functions, to control corresponding components to perform actions as required by instructions.

The radio frequency unit 110 may be configured to receive and send information or receive and send a signal in a call process. For example, the radio frequency unit 110 receives downlink information from a base station, then delivers the downlink information to the processor 170 for processing, and sends related uplink data to the base station. Generally, the radio frequency unit includes but is not limited to an antenna, at least one amplifier, a transceiver, a coupler, a low noise amplifier (LNA), a duplexer, and the like. In addition, the radio frequency unit 110 may further communicate with a network device and another device through wireless communication. The wireless communication may use any communications standard or protocol, including but not limited to a GSM, a General Packet Radio Service (GPRS), CDMA, WCDMA, LTE, an email, a short message service (SMS), and the like.

The audio circuit 160, the speaker 161, and the microphone 162 may provide an audio interface between the user and the terminal 100. The audio circuit 160 may transmit, to the speaker 161, an electrical signal converted from received audio data, and the speaker 161 converts the electrical signal into a sound signal for outputting. In addition, the microphone 162 is configured to collect a sound signal, and may further convert the collected sound signal into an electrical signal. The audio circuit 160 receives the electrical signal, converts the electrical signal into audio data, outputs the audio data to the processor 170 for processing, and then sends processed audio data to, for example, another terminal through the radio frequency unit 110, or outputs processed audio data to the memory 120 for further processing. The audio circuit may also include a headset jack 163, configured to provide a connection interface between the audio circuit and a headset. Specific quantities and specific arrangement manners of speakers and microphones may be flexibly determined based on a requirement of a designer or a vendor policy. This is not limited in this application.

The terminal 100 further includes the power supply 190 (for example, a battery) that supplies power to each component. Preferably, the power supply may be logically connected to the processor 170 by using a power management system, to implement functions such as charging, discharging, and power consumption management by using the power management system.

The terminal 100 further includes the external interface 180. The external interface may be a standard micro-Universal Serial Bus (USB) port, or may be a multi-pin connector. The external interface may be configured to connect the terminal 100 to another apparatus for communication, or may be configured to connect to a charger to charge the terminal 100.

Although not shown, the terminal 100 may further include a flash light, a WI-FI module, a BLUETOOTH module, sensors with different functions, and the like. Details are not described herein. Some or all of methods described below may be applied to the terminal shown in FIG. 1.

The present disclosure may be applied to a terminal device having a photographing function (including at least one of the photographing function or a video photographing function), and an implemented product may be in a form of an intelligent terminal, for example, a product on which a camera is installed, for example, a mobile phone, a tablet, a digital video (DV), a video camera, a camera, a portable computer, a notebook computer, an intelligent robot, a television, a security protection system, or a drone. Specifically, functional modules of the present disclosure may be deployed on a digital signal processing (DSP) chip of a related device, and may be specifically an application program or software in the DSP chip. In the present disclosure, the functional modules are deployed on the terminal device, to provide an image processing function through software installation or upgrade and hardware invoking and cooperation.

The present disclosure is mainly applied to a scenario in which an image or a video is photographed by using the terminal device. People have increasingly higher requirements for video photographing, and expect to complete special effect processing of videos while photographing, to implement video photographing experience of "what you see is what you get". According to the present disclosure, main object segmentation may be performed on an image or a video, and colors of different areas may be adjusted, to implement a real-time special effect of the image.

The following describes the present disclosure by using examples.

Example 1

Figure 2:
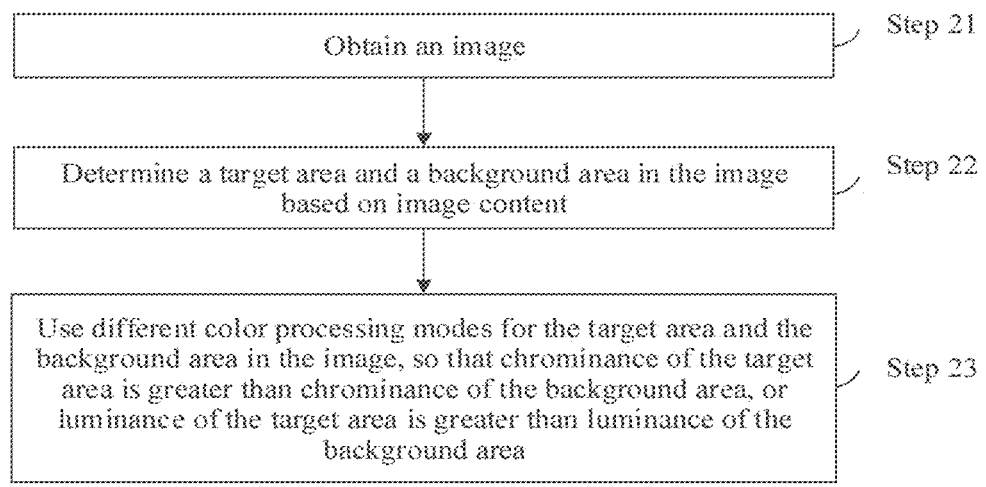
FIG. 2 is a flowchart of an image processing method according to an embodiment of the present disclosure.

For details, refer to FIG. 2. FIG. 2 is a flowchart of an image processing method according to an embodiment of the present disclosure. The method is performed in a process of photographing an image. In a specific implementation process, a terminal may configure a photographing mode. In the photographing mode, the method may include the following steps.

Step 21. Obtain (which may also be understood as photograph or capture) an image.

Specifically, when a user takes a picture, a corresponding preview stream is also displayed on a screen. A preview image may generally refer to one image in the preview stream. When the user taps a shutter, the photographed image is obtained. A size of the photographed image is, for example, but is not limited to, 1920×1080.

Step 22. Determine a target area and a background area in the image based on content (which may be understood as scene semantics) in the photographed image. More specifically, the target area and the background area may be determined in the image based on a category of an object in the image. The background area is an area of the image other than the target area. The target area corresponds to a target object in the image, namely, an object that the user expects to highlight in the image, and may be related to interactive selection of the user or a system setting. Specifically, step 22 may include S221 to S224.

S221. Preprocess the image.

The photographed image of an original size is downsampled and converted into the image of smaller resolution. A calculation amount can be reduced when calculation is performed based on the small image. In a specific implementation process, the original size (for example, m0×n0) may be downsampled to a size of m×n. Smaller values of m and n indicate a smaller subsequent calculation amount. However, if the values of m and n are excessively small, pixel resolution subsequently decreases. Experiments have shown that appropriate value ranges of m and n are [128, 512], and more specifically, [256, 300]. In addition, m and n may be equal or unequal. For example, an image of 1920×1080 may be downsampled to 256×256.

S222. Input the downsampled m×n image to a neural network to perform semantic segmentation, to determine an image mask.

The semantic segmentation refers to pixel-level segmentation performed on an object in an image, and a category of the object is marked for each pixel. An area without an object category marked is marked as a "background".

Specifically, the semantic segmentation may use a deep learning algorithm based on a convolutional neural network (CNN). A CNN-based network model is specifically described as follows.

(1) Downsampling and convolution are performed on the m×n image to obtain an m1×n1 image, an m2×n2 image, ..., and an mz×nz image, and image semantic features are extracted layer by layer to obtain an m1×n1 feature map, an m2×n2 feature map, ..., and an mz×nz feature map, namely, multi-scale semantic features, where m1, m2, ..., and mz are in a multiple relationship and less than m, and n1, n2, nz are in a multiple relationship and less than n. For example, m=2m1=4m2=, =2'×mz, and n=2n1=4n2=, =2'×nz. A value of z and the multiple relationship may be determined based on algorithm performance and a design requirement.

(2) Convolution and upsampling are performed on the m1×n1 feature map, the m2×n2 feature map, ..., and the mz×nz feature map, to fuse the multi-scale semantic features.

The convolution, downsampling, and upsampling methods mentioned above may use technologies well known in the industry, and are not limited and listed in the present disclosure.

(3) An object category that needs to be identified in the image is determined, a score of each object category on each pixel is calculated, an object category (which may be category for short) with a highest score is used as a classification result of the pixel, and a mask graph, namely, a mask, is finally obtained.

For example, if the terminal can identify k object categories (for example, at least one of a person, an animal, a plant, another preset object, or a background), k images may be obtained. Each pixel in the image obtains a score that belongs to an object category. A higher score indicates a higher probability that the pixel belongs to the object category.

Figure 3:
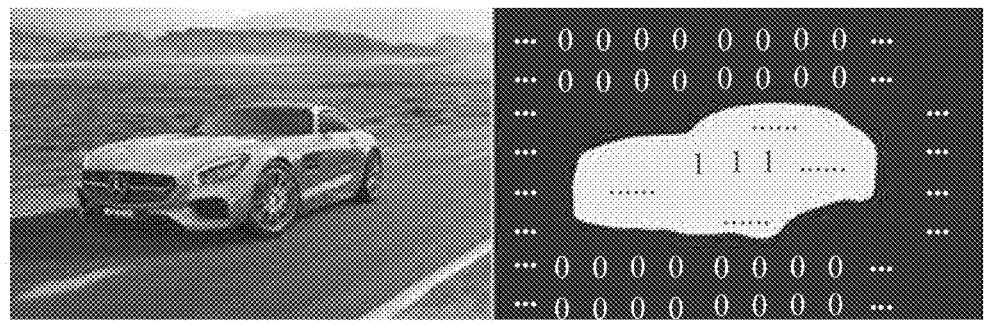
FIG. 3 shows an example of a mask identifier according to an embodiment of the present disclosure.
Figure 4:
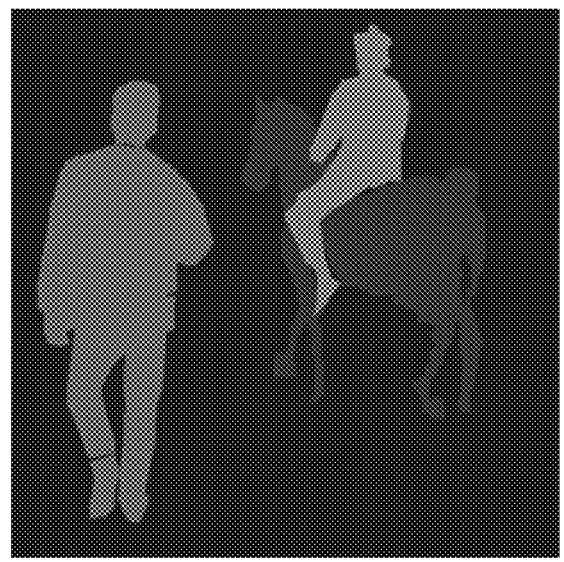
FIG. 4 shows another example of a mask identifier according to an embodiment of the present disclosure.

Once an object category of any pixel is determined, the pixel may be identified. For example, 1 is used to indicate a person, 2 is used to indicate a vehicle, 3 is used to indicate an animal, 4 is used to indicate a plant, and 0 is used to indicate a background. This is merely an example, and does not constitute any limitation. The user may randomly design a quantity of categories, the categories, and an identification method based on a design requirement. A specific example may be shown in FIG. 3. All pixel areas in which a vehicle is located are classified as a vehicle by the neural network, and are identified as 1. All pixel areas in a surrounding background part are classified as a background by the neural network, and are identified as 0. For another example, in a mask output by the neural network, areas of objects of a same category have a same label. For example, a label of a background is 0, a label of a cat is 1, and a label of a skateboard is 2. In a mask shown in FIG. 4, a same color may be further used to represent labels of a same object category. For example, a person, a horse, and a background are respectively identified by using different colors.

The mask is a result of a semantic segmentation algorithm. In an image, all pixels belonging to a category of objects are labeled as a color or identifier, and a background is also labeled as a color or identifier. The image obtained after processing is referred to as a mask, so that a segmentation result is displayed intuitively.

Content of an image may include a main object and a background. For ease of description, correspondingly, an image mask may include a main object mask and a background mask. The main object mask may correspond to a main object identified by using a segmentation method, including an individual that the user expects to highlight in an image or a photographed image, for example, a person, an animal, a plant, or a particular object (a cup, a table, clothes, decoration ...). The background mask corresponds to another area that is in the image and that is not identified as the main object mask. The image mask corresponds to the entire image. An identification capability of the main object mask is related to performance of the neural network. For example, some neural networks can identify only a person and a background. Some neural networks can identify a person, a vehicle, and a background. Some neural networks can identify only a vehicle and a background. Some neural networks can identify a person, an animal, and a background. Some neural networks can identify only an animal and a background. Some neural networks can identify an animal, a plant, a background.

It should be understood that an image may alternatively include only a main object, or may include only a background. When the image includes only the main object, the main object may also be identified as the background. These settings about the main object and the background in the image may be flexibly designed and determined by a designer.

A large amount of segmentation training data needs to be used for training of a deep neural network, and a training data set includes a large quantity of images including segmentation object categories, input images, and mask graphs. The training data set may cover various typical application scenarios of a segmentation object, and has diverse data. The input images and the mask graphs in the training data set are used to train the network, to obtain an excellent network parameter, in other words, obtain segmentation performance satisfied by the user. The obtained network parameter is used as a finally used calculation parameter of the neural network.

S223. Determine a target mask based on masks.

For different images and neural networks with different capabilities, various masks may be obtained. The terminal may further determine a mask that is in the masks and that corresponds to an object that most needs to be highlighted and prominently displayed. That is, the target mask needs to be determined. Determining the target mask includes but is not limited to the following several manners.

Manner 1. If the mask includes only one main object mask and one background mask, the main object mask is determined as the target mask.

Specifically, it is assumed that semantic segmentation is performed on the image to obtain k masks. The k masks correspond to different object categories. If k=2 and the two masks include one object mask and one background mask, an image area corresponding to the object mask is determined as the target area, and an area corresponding to the background mask is determined as the background area.

Figure 5:
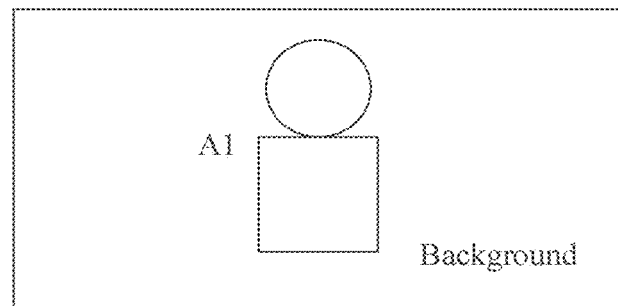
FIG. 5 is a schematic diagram of determining a target mask according to an embodiment of the present disclosure.

As shown in FIG. 5, masks of an image output by the neural network include only a main object mask A1 and a background mask. In this case, A1 may be determined as the target mask.

Manner 2. When the mask includes a plurality of main object masks and a background mask, if a quantity of pixels included in any main object mask is greater than a specific threshold, the main object mask is determined as the target main object, or if a quantity of pixels included in any main object mask is less than a specific threshold, the main object mask is re-marked, and is also marked as a background. A quantity of pixels included in the main object mask may be a quantity of pixels included in a region of the individual in the image.

Specifically, it is assumed that semantic segmentation is performed on the image to obtain k masks. The k masks correspond to different object categories. If k is greater than 2 and a quantity of pixels included in k0 object masks in the k masks is greater than a preset threshold, an image area corresponding to the k0 object masks is determined as the target area, and an image area corresponding to a remaining mask is determined as the background area, where k0 is a nonnegative integer less than k.

Figure 6:
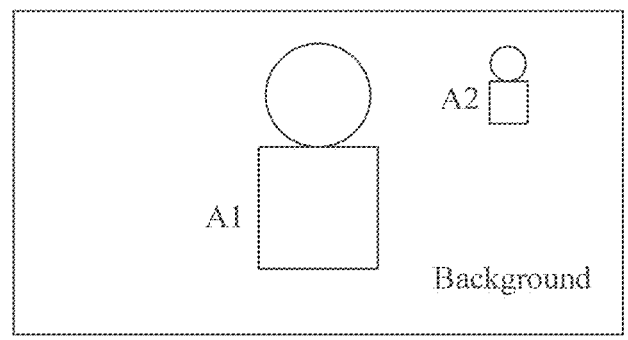
FIG. 6 is another schematic diagram of determining a target mask according to an embodiment of the present disclosure.

As shown in FIG. 6, masks of an image output by the neural network include a main object mask A1, a main object mask A2, and a background mask. If a quantity of pixels included in A1 is greater than the preset threshold and a quantity of pixels included in A2 is not greater than the preset threshold, A1 is determined as the target mask, and the main object mask A2 is re-marked as a background mask. A re-marked mask may be shown in FIG. 5. If a quantity of pixels included in A1 is greater than the preset threshold and a quantity of pixels included in A2 is also greater than the preset threshold, both A1 and A2 are determined as the target mask. If neither a quantity of pixels included in A1 nor a quantity of pixels included in A2 is greater than the preset threshold, A1 and A2 are re-identified as background masks. In other words, the image includes no main object mask.

It should be understood that, in a specific implementation process, A1 and A2 may be of a same object category or different object categories.

Manner 3. When the mask includes a plurality of main object masks and a background mask, a main object mask including a largest quantity of pixels is selected as the target mask, and other main object masks are also re-marked as the background mask.

Specifically, it is assumed that semantic segmentation is performed on the image to obtain k masks. The k masks correspond to different object categories. If k is greater than 2, an image area corresponding to a mask that includes a largest quantity of pixels and that is in the k masks is determined as the target area, and an image area corresponding to remaining masks is determined as the background area.

As shown in FIG. 6, masks of an image output by the neural network include a main object mask A1, a main object mask A2, and a background mask. A1 that includes a largest quantity of pixels is determined as the target mask, and the main object mask A2 is re-marked as a background mask. The re-marked mask may be shown in FIG. 5.

It should be understood that, in a specific implementation process, A1 and A2 may be of a same object category or different object categories.

Manner 4. When the mask includes a plurality of main object masks and a background mask, and the plurality of main object masks include a plurality of object categories, the target mask is determined based on priorities of the object categories. For example, if a priority of a person mask is higher than a priority of a vehicle mask, the person mask is the target mask, and the vehicle mask may be re-marked as a background. For example, if the priority of the person mask is higher than a priority of an animal mask and is higher than a priority of a plant mask, and a priority set by a system is that all masks whose priorities are higher than the priority of the plant mask are main object masks, both the person mask and the animal mask are target masks, and the plant mask may be re-marked as a background. It should be understood that one or more individuals belong to a same object category mask.

Specifically, it is assumed that semantic segmentation is performed on the image to obtain k masks. The k masks correspond to different object categories. If k is greater than 2, the target mask is determined from the k masks based on preset priorities of the object categories. An image area corresponding to the target mask is determined as the target area, and an image area corresponding to the remaining masks is determined as the background area.

Figure 7:
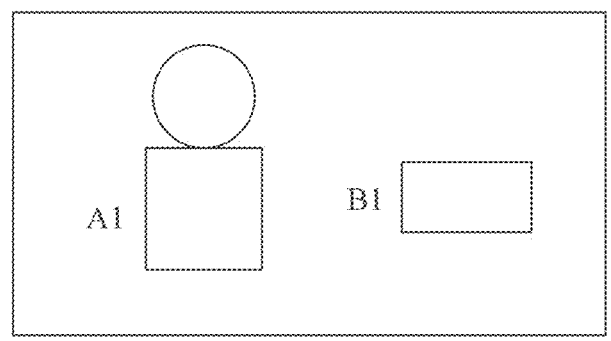
FIG. 7 is another schematic diagram of determining a target mask according to an embodiment of the present disclosure.

As shown in FIG. 7, masks of an image output by the neural network include a main object mask A1, a main object mask B1, and a background mask. A1 and B1 are of different object categories, and a priority of A1 is higher than a priority of B1. If a system sets that any main object mask whose priority is higher than or equal to that of B1 may be used as the target mask, both A1 and B1 are target masks. If a system sets that a main object mask whose priority is higher than B1 may be used as the target mask, A1 is determined as the target mask, and B1 is re-marked as a background mask.

Manner 5. If the mask includes a plurality of main object masks and a background mask, the target mask may be determined according to a selection operation input by the user. An input mode includes but is not limited to selection instructions such as screen touching and a voice. A main object mask corresponding to an individual selected by the user is the target mask.

Specifically, it is assumed that semantic segmentation is performed on the image to obtain k masks. The k masks correspond to different object categories. If k is greater than 2, the target mask is determined from the k masks according to a selection instruction of the user. An image area corresponding to the target mask is determined as the target area, and an image area corresponding to remaining masks is determined as the background area.

As shown in FIG. 7, the masks of the image output by the neural network include the main object mask A1, the main object mask B1, and the background mask. If the user taps, in a photographing process, an individual corresponding to A1 on a touchscreen, A1 is determined as the target mask, and B1 is re-marked as a background mask. If the user taps, in a photographing process, an individual corresponding to B1 on a touchscreen, B1 is determined as the target mask, and A1 is re-marked as a background mask.

Manner 6. If the mask includes a plurality of main object masks and a background mask, and the plurality of main object masks include a plurality of object categories, the target mask may be determined based on a selection operation input by the user. An input mode includes but is not limited to selection instructions such as screen touching and a voice. All main object masks of an object category corresponding to an individual selected by the user are target masks.

Specifically, it is assumed that semantic segmentation is performed on the image to obtain k masks. The k masks correspond to different object categories. If k is greater than 2, the target mask is determined from the k masks according to a selection instruction of the user. An image area corresponding to the target mask is determined as the target area, and an image area corresponding to the remaining masks is determined as the background area.

Figure 8:
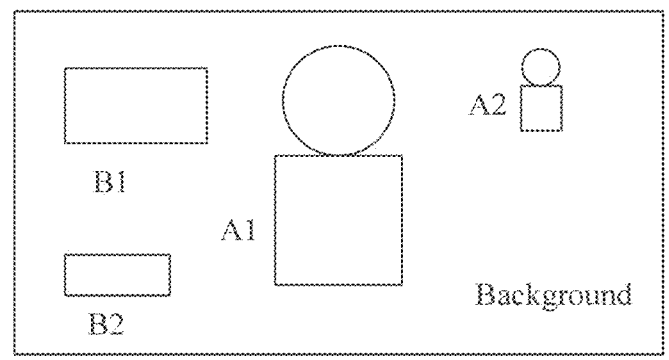
FIG. 8 is another schematic diagram of determining a target mask according to an embodiment of the present disclosure.

As shown in FIG. 8, masks of an image output by the neural network include main object masks A1, A2, B1, and B2 and a background mask. A1 and A2 are of a same object category, and B1 and B2 are of a same object category. If the user taps, in a photographing process, an individual corresponding to A1 on a touchscreen, A1 and A2 that are of the same object category are determined as target masks, and B1 and B2 are re-marked as background masks. If the user taps, in a photographing process, an individual corresponding to B2 on a touchscreen, B1 and B2 of the same object category are determined as target masks, and A1 and A2 are re-marked as background masks.

It should be understood that the foregoing specific implementations or embodiments are merely examples and should not constitute limitations. The foregoing specific implementations or embodiments may be freely combined without violating logic. Therefore, after mask segmentation is performed on the image, one or more target masks may be obtained. These target masks may be of one or more object categories, and each object category of target masks may further include one or more individuals. A displayed result is related to a rule that is set in a terminal system and that is for determining the target mask and an input of the user. In some scenarios, an image may alternatively include only a background mask.

S224. Determine the target area and the background area in the original image.

The original size of the photographed image is sampled from the mask, and the target mask and the background mask in the mask are also upsampled. An area constituted by all pixels that are of the upsampled target mask and that correspond to the original image is the target area, and an area constituted by all pixels that are of the upsampled background mask and that correspond to the original image is the background area.

Step 23. Process the target area and the background area in the image in different color processing modes to obtain a target image. The different color processing modes are used for processing, so that chrominance of the target area is greater than chrominance of the background area or luminance of the target area is greater than luminance of the background area. In other words, the chrominance of the target area in the target image is greater than the chrominance of the background area in the target image, or the luminance of the target area in the target image is greater than the luminance of the background area in the target image.

Specifically, a first color processing mode and a second color processing mode are respectively used for the target area and the background area in the image. The first color processing mode and the second color processing mode include but are not limited to the following manners.

Manner 1. The first color processing mode is retaining a color, and the second color processing mode is using a filter, for example, converting a color of the background area into black and white. Typical filters further include any of a black and white filter, a darkening filter, a retro filter, a film filter, a blurring filter, a bokeh filter, and the like.

For example, the black and white filter is to map each pixel value to a grayscale value to implement an effect of the black and white filter. For another example, the darkening filter is to darken luminance of each pixel value to achieve a special darkening effect.

Manner 2. The first color processing mode is a first filter manner, the second color processing mode is a second filter manner, and the first filter manner is different from the second filter manner. For a same image, chrominance of the image obtained in the first filter manner is greater than chrominance of the image obtained in the second filter manner.

Manner 3. The first color processing mode is a third filter manner, the second color processing mode is a fourth filter manner, and the third filter manner is different from the fourth filter manner. For a same image, luminance of the image obtained in the third filter manner is greater than luminance of the image obtained in the fourth filter manner.

It should be understood that a color is represented by both luminance and chrominance. The chrominance is a property of the color that does not include the luminance, and reflects a tone and saturation of the color, and the luminance refers to brightness of the color. Therefore, color processing includes luminance processing and/or chrominance processing.

Specifically, the filter may include adjusting chrominance, luminance, and hue, and may further include superimposed texture and the like. A color system may be adjusted in a targeted manner by adjusting the chrominance and the hue, so that the color system becomes thicker or lighter, or a tone is changed, and another color system remains unchanged. The filter may also be understood as pixel-to-pixel mapping. A pixel value of an input image is mapped to a pixel value of a target pixel by using a preset mapping table, to achieve a special effect. It should be understood that the filter may be a preset parameter mask. These color-related parameters may be parameters in a filter mask well known in the industry, or may be parameters independently designed by the user.

As a supplement, after step 23, the method further includes step 24 of storing the image processed in step 23.

According to the present disclosure, in the photographing process, the terminal may determine a target individual and a background based on image content, and perform different color processing on the target individual and the background, so that a main object in an image photographed by the user can be more prominent, and the photographed image is like a film.

Example 2

Specifically, in the present disclosure, an image processing method for video recording is similar to an image processing method for photographing, and a difference lies in that an object processed in photographing is one image while an object processed in video recording is consecutive video frames, namely, a plurality of consecutive images. The object processed in video recording may be a complete video, or may be a segment in a complete video, or a user-defined video clip within a time period range. For a processing procedure of each image in the video or the video clip, refer to the processing method in Example 1.

Specifically, an image processing method for video photographing may include the following steps.

Step 31. Obtain N photographed images, where N is a positive integer, and perform operations of steps 32 and 33 on each image, where the N images may be adjacent video frames, and a sum of the N images may be understood as a video. Alternatively, the N images may be non-adjacent.

An optional implementation of step 32 may be the same as that of step 22.

An optional implementation of step 33 may be the same as that of step 23.

As a supplement, because a video includes consecutive images, a manner of determining an individual is also related to a time sequence. Therefore, in addition to step 23, there may be more implementations in step 33. Optionally, any manner of determining a main object in S223 may have a delay. For example, a person and a background are determined in the $L1^{th}$ frame, and it may still be determined, from the $(L1+1)^{th}$ frame of image to the $(L1+L0)^{th}$ frame of image through pixel marking and mask comparison, that the person in these images is the main object, and an area corresponding to the person in these images is a target area 0. The main object and the background do not need to be determined for each frame. A moment at which the main object is determined each time may be defined by a user, or the main object may be determined periodically, for example, but not limited to, every 2 s or every 10 s. A manner of determining the main object each time includes but is not limited to the six manners in S223.

Step 34. Store the video constituted by the N images on which color processing is performed.

According to the present disclosure, in a process in which the user records a video, the terminal may determine a target individual and a background based on video content, and perform different color processing on the target individual and the background, so that a main object of a video photographed by the user can be more prominent, the photographed video is as cool as a movie, and user experience is improved.

Example 3

In the present disclosure, an image processing method for video recording is similar to an image processing method for photographing, and a difference lies in that an object processed in photographing is one image while an object processed in video recording is consecutive video frames, namely, a plurality of consecutive images. Therefore, for a processing procedure of each image, refer to the processing method in Example 1. In some complex video photographing scenarios, some areas in an image may be incorrectly detected. If a same area is separately marked as a target or a background in adjacent frames, the same area is processed into different colors according to the foregoing example color processing method, and changes of the colors of the same area in the adjacent frames cause a sensory flicker. Therefore, the flicker needs to be determined and eliminated during processing. The flicker may be understood as an object category determining error.

In a method for determining that a video flickers, a mask of a previous frame may be processed based on an optical flow to obtain an optical flow-based mask, and a difference between the optical flow-based mask and a mask of a current frame is compared. When a coincidence degree or a similarity degree exceeds a specific proportion, it is determined that no flicker occurs. When the coincidence degree or the similarity degree does not exceed the specific proportion, it is determined that a flicker occurs. In addition, it should be understood that flicker determining is a continuous process. Optionally, a specific method for determining whether a flicker exists is as follows.

(1) First, an optical flow of adjacent frames is calculated, where the optical flow indicates a displacement relationship between pixels in the adjacent frames (a $(t-1)^{th}$ frame and a $t^{th}$ frame).

(2) A mask of the $(t-1)^{th}$ frame is obtained, and an optical flow mask F of the $t^{th}$ frame is calculated based on the mask of the $(t-1)^{th}$ frame and optical flow information of the $(t-1)^{th}$ frame and the $t^{th}$ frame, where the optical flow mask is obtained through calculation based on the optical flow.

(3) A mask S of the $t^{th}$ frame is obtained.

(4) A pixel set SF of a main object in the optical flow mask F is counted, and a pixel set SS of the main object in the mask S is counted. Quantities of pixels in a union set and an intersection set of the SF and the SS are respectively Nu and N1. When (Nu−N1)/Nu is greater than a specific threshold, it is considered that there is a relatively large difference between masks of the adjacent frames $(t-1)^{th}$ and $t^{th}$, and it is determined that a flicker occurs between the $(t-1)^{th}$ frame and the $t^{th}$ frame, or it may be understood that a flicker occurs in the $t^{th}$ frame. The relatively large difference indicates that a same object may be misjudged as different object categories. For example, a same individual in the frames $(t-1)^{th}$ and $t^{th}$ is separately determined as a person and a monkey.

Optionally, if in the first N0 (a positive integer greater than 2) images of a current image, a quantity of groups of adjacent images with a same object determined as different object categories is greater than a preset threshold, it may be determined that flicker exception processing needs to be performed on the current frame. If it is determined that a quantity of groups of adjacent images with a same object determined as different object categories is not greater than the preset threshold, it may be determined that flicker exception processing does not need to be performed on the current frame.

Optionally, for example, for a predetermined quantity of historical adjacent frames or a preset quantity of historical frames, if it is determined that a flicker occurs in more than half of the frames (for example, it is determined that a flicker occurs in three video frames in the first five adjacent frames of the current video frame), it may be determined that flicker exception processing needs to be performed on the current frame. If it is determined that a flicker occurs in less than half of the frames (for example, it is determined that a flicker occurs in one of the first five adjacent frames of the current video frame), it may be determined that flicker exception processing does not need to be performed on the current frame.

It should be understood that a current video image may be understood as an image that is being recorded at a moment. The moment herein may be understood as a general moment in some scenarios, or may be understood as a some specific moment in some scenarios, for example, a latest moment or a moment in which a user is interested.

Specifically, the image processing method for video photographing in this example may include the following steps.

Step 41. Obtain N photographed images, where N is a positive integer, and perform operations of steps 32 and 33 on each image, where the N images may be adjacent video frames, and a sum of the N images may be understood as a video, or the N images may be non-adjacent.

Step 42. Determine whether a quantity of groups of adjacent images in which a flicker occurs in the first N0 frames of the current frame (the current image) is greater than the preset threshold. Herein, N0 and the threshold may be set by the user. For example, N0 is a selected quantity of historical video frame samples, and the threshold may be 1/2, 2/3, or the like of N0. This is merely an example and is not limited.

If a determining result is not greater than the preset threshold, operations of steps 43 and 44 are performed on the currently photographed or captured image.

An optional implementation of step 43 may be the same as that of step 32.

An optional implementation of step 44 may be the same as that of step 33.

If the determining result is greater than the preset threshold, an operation of step 45 is performed on the currently photographed or captured image.

Step 45. Process all image areas of the current frame by using a same color processing method to obtain a target image. The same color processing method may be the same as a color processing method of the background area in a previous frame, or may be the same as a color processing method of the target area in a previous frame, or may be the same as a color processing method of an entire image in a previous frame. For example, a color processing method that is the same as that for the background area in step 33 (23) may be used for the entire image. Alternatively, a color processing method that is the same as that for the target area in step 33 (23) may be used for the entire image. For example, the entire image remains colorful, or the entire image is black and white, or a first or second color processing mode (including but not limited to the color processing modes in Example 1) is used for the entire image.

In this case, for the current frame, a mask segmentation procedure similar to that in step 22 may exist or may be omitted. This is not limited in this example.

After step 45, step 46 of storing the video constituted by the N images on which color processing is performed is performed. N is a positive integer.

According to the present disclosure, in a process in which the user records a video, the terminal may determine a target individual and a background based on video content, and perform different color processing on the target individual and the background, so that a main object of a video photographed by the user can be more prominent, the photographed video is as cool as a movie, and user experience is improved.

Example 4

In some application scenarios, content of an image photographed by a user usually changes. Therefore, a main object of the image usually changes. The user also expects to freely select a color processing mode of the main object in different images, to independently control a video style.

An image processing method in a video photographing process may include the following steps.

Step 51. A terminal obtains a video frame.

Step 52. The terminal determines a main object area and a background area in any video frame obtained from a video.

Step 53. The terminal uses any color processing mode at any time for the main object area, and uses any color processing mode at any time for the background area. However, it needs to be ensured that for any image, luminance or chrominance of a main object area after color processing is greater than luminance or chrominance of a background area after color processing. Alternatively, for any image, chrominance or luminance of the image obtained in a color processing mode used for a main object area is greater than chrominance or luminance of the image obtained in a color processing mode used for a background area.

Example 5

In some application scenarios, content of an image photographed by a user usually changes. Therefore, a main object of the image usually changes. The user also expects to freely select a color processing mode of the main object in different images, to independently control a video style. Especially, a color is changed by time period.

An image processing method in a video photographing process may include the following steps.

Step 61. Capture N1 images in a first time period and capture N2 images in a second time period, where the first time period and the second time period are adjacent time periods, and both N1 and N2 are positive integers, the first time period and the second time period may be duration in which the user can identify an image change with naked eyes, and N1 and N2 are determined by frame rates and duration of the time periods during video recording. This is not limited in the present disclosure.

Step 62. Determine a first target area and a first background area in each of the N1 images, where the first background area is an area of the image other than the first target area, and the first target area in each of the N1 images corresponds to a first object (which may include at least one object), and determine a second target area and a second background area in each of the N2 images, where the second background area is an area of the image other than the second target area, and the second target area in each of the N2 images corresponds to a second object (which may include at least one object).

Step 63. Process the first target area in a first color processing mode, process the first background area in a second color processing mode, process the second target area in a third color processing mode, and process the second background area in a fourth color processing mode, to obtain a target video, where in the target video, chrominance of the first target area is greater than chrominance of the first background area, or luminance of the first target area is greater than luminance of the first background area, and chrominance of the second target area is greater than chrominance of the second background area, or luminance of the second target area is greater than luminance of the second background area.

Example 6

In some application scenarios, content of an image photographed by a user usually changes. Therefore, a main object of the image usually changes. The user also expects to freely select a target main object that the user expects to highlight in different images. For example, an image area corresponding to a first object is determined as a target area in a first time period, an image area corresponding to a second object is determined as a target area in a second time period, and the first object and the second object are different objects, individuals, or object categories.

In this scenario, an image processing method in a video photographing process may include the following steps.

An optional implementation of step 71 may be the same as that of step 61.

Step 72. Determine a first target area and a first background area in any one of the N1 images based on image content, and determine a second target area and a second background area in any one of the N2 images based on image content, where an object or an object category corresponding to the second target area is different from an object or an object category corresponding to the first target area, so that a system and the user can independently select a target main object and the target area of the image. An image includes a main object and a background, and correspondingly, the image includes a target area and a background area.

For example, the first object is a person, and the second object is an animal. For example, the first object is a person A, and the second object is a person B. For example, the first object is two persons, and the second object is a dog and two cats. A remaining area that is not identified is marked as the background.

In this method, an image mask may be determined by using the foregoing methods in S221 and S222. However, a subsequent method is not limited to determining a target object in the mask for each image.

Optionally, in the image mask, the user may freely input the first object and the second object, and the first object and the second object are determined according to a selection instruction input by the user. For example, if the user selects an individual, the system identifies a pixel corresponding to an instruction input by the user, further identifies a specific (/some) individual (/individuals) (/may be at least one individual) or a specific (/some) object category (/object categories) (/may be at least one object category) of a mask selected by the user, further determines a specific (/some) individual (/individuals) or all individuals in which a specific (/some) object category (/object categories), as the first object, and determines the first object or the image area corresponding to the first object, as the first target area. This situation may be maintained for a period of time. In other words, in subsequent several frames, an area corresponding to a mask corresponding to the first object is the first target area until the user selects another individual at a next moment, and an area corresponding to the new individual is determined as the second target area according to a method similar to the foregoing method. In an image, an image area other than the first target area or the second target area is the background area. To be specific, the area corresponding to the mask corresponding to the first object in the first time period is the first target area, and the area corresponding to the mask corresponding to the second object in the second time period is the second target area.

Optionally, in the image mask, the system may determine a target mask of an image in a time period in the image mask based on a preset time interval (for example, but not limited to 1 s or 2s) or a preset quantity of frames (for example, but not limited to 50 frames or 100 frames). For example, a first target mask is determined in the $101^{th}$ frame, and a mask that has a same object category or individual as the first target mask in the $101^{th}$ frame is used as the first target mask for each of the following 102 frames to 200 frames until a second target mask is determined in the $201^{th}$ frame. For each of the following 202 frames to 300 frames, a mask that has a same object category or individual as the second target mask in the $201^{th}$ frame is used as the second target mask. It should be understood that numbers of the foregoing example may be predefined by the user or the system. To be specific, a target mask is determined at a moment, and the mask of this type or the mask of this individual is continuously used for a period of time.

For a method for determining the first target mask ranked first and the second target mask ranked first, refer to, but not limited to, any one of the six manners in step S223. Therefore, the first target mask and the second target mask may be of a same object category or a same individual, or may be of different object categories or different individuals. This is related to an identification capability of a network, a scene image change, or a user input command.

In addition, the first target area, the first background area, the second target area, and the second background area are further determined according to a method in S224. Details are not described in this example.

An optional implementation of step 73 may be the same as that of step 63.

In addition, because this example may vary by time period, there may be a plurality of combinations of color processing methods.

For example, the first color processing mode is the same as the third color processing mode, and the second color processing mode is the same as the fourth color processing mode. This color processing mode has good consistency.

For example, the first color processing mode is the same as the third color processing mode, and the second color processing mode is different from the fourth color processing mode. In this color processing mode, colors of the target main object are consistent, and background colors change, so that an overall visual effect is more dazzling.

For example, the first color processing mode is different from the third color processing mode, and the second color processing mode is the same as the fourth color processing mode. In this color processing mode, background colors are consistent, and colors of the target main object change, so that the target main object is more prominent.

For example, the first color processing mode is different from the third color processing mode, and the second color processing mode is different from the fourth color processing mode. In this color processing mode, more color transformation manners can be provided, and more color cooperation can be provided based on requirements of different scenarios.

The first color processing mode or the third color processing mode includes a filter, for example, color retaining or color enhancement. The second color processing mode or the fourth color processing mode includes filters such as a black and white filter, a darkening filter, a retro filter, a film filter, a blurring filter, and a bokeh filter.

Specifically, for color processing methods for a target area and a background area of a same image, refer to step 23. For the N2 images, the third color processing mode and the fourth color processing mode are respectively similar to the first color processing mode and the second color processing mode.

According to the foregoing solutions, in some scenarios, the user may freely select a color processing mode of a background in different images, to highlight different backgrounds. In some scenarios, the user may freely select a color processing mode of a main object in different images, to highlight the main object in different degrees or forms.

It should be understood that, in different examples of the present disclosure, signals indicated by a same label may have different sources or may be obtained in different manners. This does not constitute a limitation. In addition, in step references of different examples, "the same as step xx" focuses more on that signal processing logic of the two steps is similar. This is not limited to that both an input and an output of the two steps need to be completely the same, and that the two method procedures are completely equivalent. Appropriate citations and variations that can be caused by a person skilled in the art shall fall within the protection scope of the present disclosure.

The present disclosure provides an image processing method. A target area and a background area are determined in an image by performing mask segmentation on the image. Different color processing modes are applied to the target area and the background area, so that luminance of the target area is greater than luminance of the background area, or chrominance of the target area is greater than chrominance of the background area, and a main object corresponding to the target area is more prominently highlighted. This implements a movie special effect.

Figure 9:
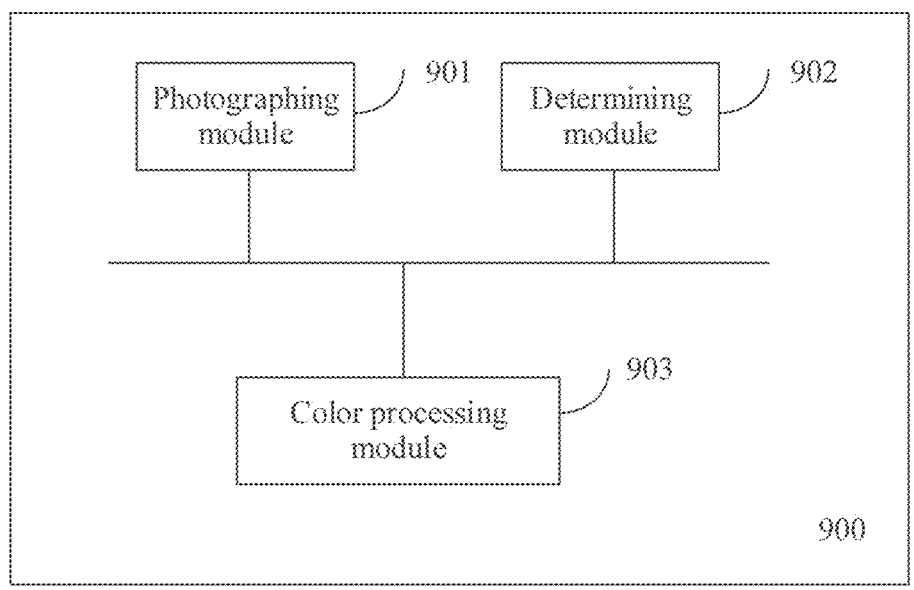
FIG. 9 is a schematic diagram of an image processing apparatus according to an embodiment of the present disclosure.

Based on the image processing method provided in the foregoing embodiment, an embodiment of the present disclosure provides an image processing apparatus 900. The apparatus may be used in a plurality of terminal devices, and may be in any implementation form of the terminal 100, for example, a terminal having a video photographing function. Referring to FIG. 9, the apparatus includes a photographing module 901, configured to obtain an image, which may be photographing or video photographing, where the module is specifically configured to perform the method in step 21, step 31, step 51, step 61, or step 71 in the foregoing example and a method that may be equivalent to the method, and the module may be implemented by a processor by invoking a corresponding program instruction in a memory to control a camera to capture the image, a determining module 902, configured to determine a target area and a background area in the image based on image content, where the module is specifically configured to perform the method in step 22, step 32, step 52, step 62, or step 72 in the foregoing example and a method that may be equivalent to the method, and the module may be implemented by the processor by invoking a corresponding program instruction in the memory to implement a corresponding algorithm, and a color processing module 903, configured to use different color processing modes for the target area and the background area in the image to obtain a target image or a target video, so that chrominance of the target area is greater than chrominance of the background area, or luminance of the target area is greater than luminance of the background area, where the module is specifically configured to perform the method in step 23, step 33, step 53, step 63, or step 73 in the foregoing example and a method that may be equivalent to the method, and the module may be implemented by the processor by invoking a corresponding program instruction in the memory by using a specific algorithm.

In addition, the apparatus may further include a storage module 904, configured to store the image or the video on which color processing is performed.

The foregoing specific method examples, explanations and descriptions of technical features in the embodiments, and extensions of a plurality of implementation forms are also applicable to method execution in the apparatus, and details are not described in the apparatus embodiments.

The present disclosure provides an image processing apparatus. Mask segmentation is performed on an image, so that a target area and a background area in the image are determined based on image content. Different color processing modes are applied to the target area and the background area, so that luminance of the target area is greater than luminance of the background area, or chrominance of the target area is greater than chrominance of the background area, and a main object corresponding to the target area is more prominently highlighted. This achieves a movie special effect.

Figure 10:
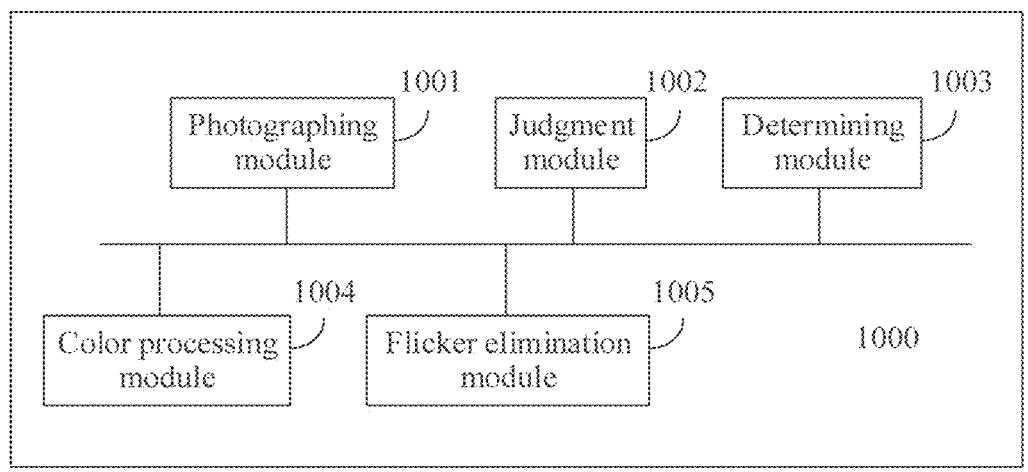
FIG. 10 is another schematic diagram of an image processing apparatus according to an embodiment of the present disclosure.

Based on the image processing method provided in the foregoing embodiment, an embodiment of the present disclosure further provides an image processing apparatus 1000. The apparatus may be used in a plurality of terminal devices, and may be in any implementation form of the terminal 100, for example, a terminal having a video photographing function. Referring to FIG. 10, the apparatus includes a photographing module 1001, configured to obtain an image, which may be photographing or video photographing, where the module is specifically configured to perform the method in step 21, step 31, step 51, step 61, or step 71 in the foregoing example and a method that may be equivalent to the method, and the module may be implemented by a processor by invoking a corresponding program instruction in a memory to control a camera to capture the image, a judgment module 1002, configured to determine whether a quantity of flickering frames in first N0 frames of a current frame is greater than a preset threshold, and if a determining result is that the quantity of flickering frames is not greater than the preset threshold, continue to trigger a determining module 1003 and a color processing module 1004 to perform related functions, or if a determining result that the quantity of flickering frames is greater than the preset threshold, continue to trigger a flicker elimination module 1005 to perform a related function, and the module 1002 is specifically configured to perform the method in step 42 in the foregoing example and a method that may be equivalent to the method, and the module may be implemented by the processor by invoking a corresponding program instruction in the memory to implement a corresponding algorithm, a determining module 1003, configured to, when the judgment module 1002 determines that the quantity of flickering frames in the first N0 frames of the current frame is not greater than the preset threshold, determine a target area and a background area in the image based on image content, where the module is specifically configured to perform the method in step 22, step 32, step 43, step 52, step 62, or step 72 in the foregoing example and a method that may be equivalent to the method, and the module may be implemented by the processor by invoking a corresponding program instruction in the memory to implement a corresponding algorithm, a color processing module 1004, configured to use different color processing modes for the target area and the background area in the image, so that chrominance of the target area is greater than chrominance of the background area, or luminance of the target area is greater than luminance of the background area, where the module is specifically configured to perform the method in step 23, step 33, step 44, step 53, step 63, or step 73 in the foregoing example and a method that may be equivalent to the method, and the module may be implemented by the processor by invoking a corresponding program instruction in the memory by using a specific algorithm, and a flicker elimination module 1005, configured to, when the judgment module 1002 determines that the quantity of flickering frames in the first N0 frames of the current frame is greater than the preset threshold, use a same color processing method for all image areas of the current frame, where the same color processing method may be the same as a color processing method of the background area in a previous frame, or may be the same as a color processing method of the target area in a previous frame, and the module is specifically configured to perform the method in step 45 in the foregoing example and a method that may be equivalent to the method, and the module may be implemented by the processor by invoking a corresponding program instruction in the memory by using a specific algorithm.

In addition, the apparatus 1000 may further include a storage module 1006, configured to store the image or the video on which color processing is performed.

The foregoing specific method examples, explanations and descriptions of technical features in the embodiments, and extensions of a plurality of implementation forms are also applicable to method execution in the apparatus, and details are not described in the apparatus embodiments.

The present disclosure provides the image processing apparatus. Mask segmentation is performed on the image, so that the target area and the background area in the image are determined based on image content. The different color processing modes are applied to the target area and the background area, so that the luminance of the target area is greater than the luminance of the background area, or the chrominance of the target area is greater than the chrominance of the background area, and a main object corresponding to the target area is more prominently highlighted. This implements a movie special effect.

It should be understood that division into the modules in the foregoing apparatus is merely logical function division. In an actual implementation, some or all of the modules may be integrated into one physical entity, or may be physically separated. For example, each of the foregoing modules may be a separate processor element, or may be integrated on a chip of a terminal, or may be stored in a storage element of a controller in a form of program code. A processor element of the processor invokes and executes a function of each of the foregoing modules. In addition, the modules may be integrated or may be implemented independently. The processor element herein may be an integrated circuit chip and has a signal processing capability. In an implementation process, steps in the foregoing methods or the foregoing modules may be implemented by using a hardware integrated logical circuit in the processor element, or by using instructions in a form of software. The processor element may be a general-purpose processor, for example, a central processing unit (CPU), or may be one or more integrated circuits configured to implement the foregoing methods, for example, one or more application-specific integrated circuits (ASICs), one or more microprocessors (for example, one or more DSPs), or one or more field-programmable gate arrays (FPGAs).

It should be understood that in the specification, claims, and the accompanying drawings of the present disclosure, the terms "first", "second", and the like are intended to distinguish between similar objects but do not necessarily indicate a specific order or sequence. It should be understood that the data termed in such a way is interchangeable in a proper circumstance, so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to the expressly listed steps or modules, but may include other steps or modules not expressly listed or inherent to such a process, method, product, or device.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing the specific function in one or more processes in the flowcharts and/or in one or more blocks in the block diagrams.

Although some embodiments of the present disclosure have been described, persons skilled in the art can make changes and modifications to these embodiments once they learn the basic concept. Therefore, the appended claims are intended to be construed as to cover the listed embodiments and all changes and modifications falling within the scope of the present disclosure. Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method comprising:
   capturing an image;
   identifying a main object area or a background area in the image based on a category of an object in the image and using a neural network, wherein the background area is an area of the image other than the main object area, and wherein the identifying comprises:
      performing, through the neural network, semantic segmentation on the image to obtain a plurality of masks, wherein the masks correspond to different object categories;
      obtaining a target mask from the masks based on priorities of the object categories;
      identifying, as the main object area, a first image area corresponding to the target mask; and
      identifying, as the background area, a second image area corresponding to remaining masks of the masks;
   when a terminal identifies a main subject and a background in the image, retaining a color of the main object area in the image; and performing black and white processing or blurring processing on the background area in the image;
   when the terminal identifies only the background, performing the black and white processing or blurring processing on the background area; and
   generating a target image or a target video based on the image.

2. The method of claim 1, wherein a first mask of a first object category identifies the main subject area, wherein a second mask of a second object category identifies the background area, wherein the first object category comprises at least one of a person, an animal, a plant, a vehicle, or another preset object category, wherein the second object category is the background, and wherein the method further comprises determining the first mask and the second mask based on the neural network.

3. The method of claim 1, further comprising obtaining the neural network based on a training data set for training, wherein the training data set comprises input images and mask graphs of a plurality of application scenarios.

4. The method of claim 2, wherein the neural network identifies at least two object categories of the person, the animal, the plant, the vehicle, clothes, or the other preset object category.

5. The method of claim 2, wherein a first quantity of pixels that are in the image and that correspond to the first mask is greater than a second quantity of pixels that are in the image and that correspond to a third mask of a third object category, and wherein the third object category is different from the second object category.

6. The method of claim 2, wherein the first mask has a main object determining priority greater than a determining priority of another mask corresponding to another object category.

7. The method of claim 1, wherein the main object area comprises a plurality of individuals, and wherein the individuals belong to a same object category or different object categories.

8. The method of claim 1, further comprising obtaining the main object area by performing pixel-level segmentation on the object using the neural network.

9. An image processing apparatus, comprising:
   a processor; and
   a memory coupled to the processor and configured to store instructions that, when executed by the processor, cause the image processing apparatus to be configured to:
      capture an image;
      identify a main object area or a background area in the image based on a category of an object in the image using a neural network, wherein the background area is an area of the image other than the main object area, and wherein to identify the main object area or the background area, the instructions further cause the image processing apparatus to be configured to:
         perform, through the neural network, semantic segmentation on the image to obtain a plurality of masks, wherein the masks correspond to different object categories;
         determine a target mask from the masks based on priorities of the object categories;
         identify, as the main object area, a first image area corresponding to the target mask; and
         identify, as the background area, a second image area corresponding to remaining masks of the masks;
      when the processor identifies a main subject and a background in the image,
         retain a color of the main object area in the image; and
         perform black and white processing or blurring processing on the background area in the image;
      when the processor identifies only the background, perform the black and white processing or blurring processing on the background area; and
      generate a target image or a target video based on the image after processing.

10. The image processing apparatus of claim 9, wherein a first mask of a first object category identifies the main subject area, wherein a second mask of a second object category identifies the background area, wherein the first object category comprises at least one of a person, an animal, a plant, a vehicle, or another preset object category, wherein the second object category is the background, and wherein the instructions further cause the image processing apparatus to be configured to determine the first mask and the second mask based on the neural network.

11. The image processing apparatus of claim 9, wherein the instructions further cause the image processing apparatus to be configured to obtain the neural network is based on a training data set for training, wherein the training data set comprises input images and mask graphs of a plurality of application scenarios.

12. The image processing apparatus of claim 10, wherein the neural network identifies at least two object categories of the person, the animal, the plant, the vehicle, clothes, or the other preset object category.

13. The image processing apparatus of claim 10, wherein a first quantity of pixels that are in the image and that correspond to the first mask is greater than a second quantity of pixels that are in the image and that correspond to a third mask of a third object category, and wherein the third object category is different from the second object category.

14. The image processing apparatus of claim 10, wherein the first mask has a main object determining priority greater than a determining priority of another mask corresponding to another object category.

15. The image processing apparatus of claim 9, wherein the main object area comprises a plurality of individuals, and wherein the individuals belong to a same object category or different object categories.

16. The image processing apparatus of claim 9, wherein the instructions further cause the image processing apparatus to be configured to obtain the main object area by performing pixel-level segmentation on the object using the neural network.

17. A terminal device, wherein the terminal device comprises:
a camera configured to capture an image;
a processor coupled to the camera; and
a memory coupled to the processor and configured to store instructions that, when executed by the processor, cause the terminal device to be configured to:
capture an image;
identify a main object area or a background area in the image based on a category of an object in the image using a neural network, wherein the background area is an area of the image other than the main object area, and wherein to identify the main object area or the background area, the instructions that, when executed by the processor, cause the terminal device to be configured to:
perform, through the neural network, semantic segmentation on the image to obtain a plurality of masks, wherein the masks correspond to different object categories;
determine a target mask from the masks based on priorities of the object categories;
identify, as the main object area, a first image area corresponding to the target mask; and
identify, as the background area, a second image area corresponding to remaining masks of the masks;
when the terminal device identifies a main subject and a background in the image,
retain a color of the main object area in the image; and
perform black and white processing or blurring processing on the background area in the image;
when the terminal device identifies only the background, perform the black and white processing or blurring processing on the background area; and
generate a target image or a target video based on the image after processing.

18. The terminal device of claim 17, wherein the terminal device further comprises an antenna system configured to receive and send a wireless communication signal under control of the processor to implement wireless communication with a mobile communications network that is one or more of a Global System for Mobile Communications (GSM) network, a code division multiple access (CDMA) network, a 3rd generation (3G) network, a 4th generation (4G) network, a 5th generation (5G) network, a frequency division multiple access (FDMA) network, a time division multiple access (TDMA) network, a primary domain controller (PDC) network, a total access communication system (TACS) network, an Advanced Mobile Phone System (AMPS) network, a wideband CDMA (WCDMA) network, a time domain synchronous CDMA (TDSCDMA) network, a WI-FI network, or a Long-Term Evolution (LTE) network.

19. An image processing apparatus, comprising:
a processor; and
a memory coupled to the processor and configured to store instructions that, when executed by the processor, cause the image processing apparatus to be configured to:
photograph a video;
identify a target area or a background area in a video image of the video based on a category of an object in the video image using a neural network, wherein the back round area is an area of the video image other than the target area, and wherein to identify the target area or the background area, the instructions that, when executed by the processor, cause the image processing apparatus to be configured to:
perform, through the neural network, semantic segmentation on the video image to obtain a plurality of masks, wherein the masks correspond to different object categories;
determine a target mask from the masks based on priorities of the object categories;
identify, as the target area, a first image area corresponding to the target mask; and
identify, as the background area, a second image area corresponding to remaining masks of the masks;
determine a main object in the video image of the video; and
retain a color of the target area in the video image, wherein the target area corresponds to the main object; and
perform black and white processing on the background area in the video image to obtain a target video,
wherein the background area is an area of the video image other than the target area.

20. The image processing apparatus of claim 19, wherein the instructions further cause the image processing apparatus to be configured to perform filter processing on the background area, and wherein the filter processing comprises at least one of bokeh processing, darkening processing, retro processing, film processing, or texture superimposition processing.

* * * * *